(12) United States Patent
Jeon et al.

(10) Patent No.: US 12,341,956 B2
(45) Date of Patent: Jun. 24, 2025

(54) IMAGE ENCODING AND DECODING METHOD USING ADAPTIVE ALTERNATIVE MODE

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Bum Yoon Kim, Yongin-si (KR); Jee Yoon Park, Seoul (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 66 days.

(21) Appl. No.: 18/038,171

(22) PCT Filed: Nov. 23, 2021

(86) PCT No.: PCT/KR2021/017285
§ 371 (c)(1),
(2) Date: May 22, 2023

(87) PCT Pub. No.: WO2022/108421
PCT Pub. Date: May 27, 2022

(65) Prior Publication Data
US 2024/0007620 A1 Jan. 4, 2024

(30) Foreign Application Priority Data

Nov. 23, 2020 (KR) .................. 10-2020-0157794
Nov. 23, 2021 (KR) .................. 10-2021-0161970

(51) Int. Cl.
*H04N 19/11* (2014.01)
*H04N 19/159* (2014.01)
(Continued)

(52) U.S. Cl.
CPC .......... *H04N 19/11* (2014.11); *H04N 19/159* (2014.11); *H04N 19/176* (2014.11); *H04N 19/186* (2014.11); *H04N 19/593* (2014.11)

(58) Field of Classification Search
None
See application file for complete search history.

(56) References Cited

U.S. PATENT DOCUMENTS 8,804,827 B2    8/2014   Yang et al.
9,124,900 B2    9/2015   Yang et al.
(Continued)

FOREIGN PATENT DOCUMENTS

KR    20150034912 A    4/2015
KR    101624942 B1    5/2016
(Continued)

OTHER PUBLICATIONS

International Search Report cited in corresponding international patent application No. PCT/KR2021/017285; Feb. 23, 2023; 5 pp.

*Primary Examiner* — Reza Aghevli
(74) *Attorney, Agent, or Firm* — Lempia Summerfield Katz LLC

(57) ABSTRACT

An image decoding method for decoding a current block by using intra prediction includes: decoding information related to a chroma intra prediction mode of the current block from a bitstream; determining the chroma intra prediction mode by using a basic intra prediction mode set and an alternative mode according to a first luminance intra prediction mode corresponding to the current block and the related information; generating a prediction block of the current block by (Continued)

using the chroma intra prediction mode; reconstructing a residual block of the current block from the bitstream; and reconstructing the current block by adding the prediction block and the residual block. The alternative mode is adaptively determined.

20 Claims, 9 Drawing Sheets

(51) Int. Cl.
*H04N 19/176* (2014.01)
*H04N 19/186* (2014.01)
*H04N 19/593* (2014.01)

(56) References Cited

U.S. PATENT DOCUMENTS

| | | | |
|---|---|---|---|
| 9,325,993 B2 | 4/2016 | Yang et al. | |
| 9,351,001 B2 | 5/2016 | Yang et al. | |
| 9,503,729 B2 | 11/2016 | Yang et al. | |
| 9,654,782 B2* | 5/2017 | Chong | H04N 19/103 |
| 9,706,210 B2* | 7/2017 | Chong | H04N 19/176 |
| 9,743,080 B2 | 8/2017 | Yang et al. | |
| 9,906,789 B2* | 2/2018 | Yang | H04N 19/186 |
| 10,021,384 B2 | 7/2018 | Seregin et al. | |
| 10,419,755 B2* | 9/2019 | Karczewicz | H04N 19/176 |
| 10,455,228 B2 | 10/2019 | Seregin et al. | |
| 10,567,759 B2 | 2/2020 | Seregin et al. | |
| 10,609,402 B2 | 3/2020 | Zhao et al. | |
| 10,630,986 B2 | 4/2020 | Seregin et al. | |
| 11,070,811 B2 | 7/2021 | Seregin et al. | |
| 11,259,039 B2 | 2/2022 | Zhao et al. | |
| 11,509,899 B2 | 11/2022 | Seregin et al. | |
| 11,962,780 B2* | 4/2024 | Park | H04N 19/96 |
| 2013/0272401 A1* | 10/2013 | Seregin | H04N 19/593 |
| | | | 375/240.12 |
| 2014/0098862 A1* | 4/2014 | Yang | H04N 19/11 |
| | | | 375/240.12 |
| 2014/0192885 A1* | 7/2014 | Seregin | H04N 19/55 |
| | | | 375/240.16 |
| 2014/0219342 A1* | 8/2014 | Yu | H04N 19/19 |
| | | | 375/240.12 |
| 2014/0328387 A1* | 11/2014 | Puri | H04N 19/136 |
| | | | 375/240.02 |
| 2014/0328399 A1 | 11/2014 | Yang et al. | |
| 2014/0341282 A1 | 11/2014 | Yang et al. | |
| 2014/0376634 A1* | 12/2014 | Guo | H04N 19/523 |
| | | | 375/240.16 |
| 2015/0195559 A1* | 7/2015 | Chen | H04N 19/11 |
| | | | 375/240.16 |
| 2015/0296221 A1 | 10/2015 | Yang et al. | |
| 2015/0358631 A1* | 12/2015 | Zhang | H04N 19/176 |
| | | | 375/240.16 |
| 2016/0007020 A1 | 1/2016 | Yang et al. | |
| 2016/0219283 A1* | 7/2016 | Chen | H04N 19/105 |
| 2017/0034510 A1 | 2/2017 | Yang et al. | |
| 2017/0034526 A1* | 2/2017 | Rapaka | H04N 19/127 |
| 2017/0094274 A1* | 3/2017 | Chien | H04N 19/159 |
| 2017/0094314 A1* | 3/2017 | Zhao | H04N 19/625 |
| 2017/0150186 A1* | 5/2017 | Zhang | H04N 19/124 |
| 2017/0238001 A1* | 8/2017 | Li | H04N 19/96 |
| 2017/0244966 A1* | 8/2017 | Joshi | H04N 19/593 |
| 2017/0272748 A1* | 9/2017 | Seregin | H04N 19/159 |
| 2017/0272759 A1* | 9/2017 | Seregin | H04N 19/70 |
| 2017/0310962 A1* | 10/2017 | Yang | H04N 19/159 |
| 2017/0332075 A1* | 11/2017 | Karczewicz | H04N 19/70 |
| 2018/0098063 A1* | 4/2018 | Chen | H04N 19/139 |
| 2018/0295365 A1 | 10/2018 | Seregin et al. | |
| 2019/0342568 A1* | 11/2019 | Zhao | H04N 19/149 |
| 2020/0195949 A1 | 6/2020 | Zhao et al. | |
| 2020/0221094 A1 | 7/2020 | Seregin et al. | |
| 2021/0266554 A1 | 8/2021 | Seregin et al. | |
| 2022/0060728 A1 | 2/2022 | Zhao et al. | |
| 2023/0064033 A1 | 3/2023 | Seregin et al. | |
| 2023/0085937 A1* | 3/2023 | Deshpande | H04N 19/70 |
| 2023/0089002 A1* | 3/2023 | Laroche | H04N 19/30 |
| | | | 375/240.02 |
| 2023/0105972 A1* | 4/2023 | Ye | H04N 19/14 |
| | | | 375/240.12 |
| 2023/0109849 A1* | 4/2023 | Xiu | H04N 19/132 |
| | | | 375/240.03 |
| 2023/0111806 A1* | 4/2023 | Deng | H04N 19/157 |
| | | | 375/240.26 |
| 2023/0114860 A1* | 4/2023 | Zhang | H04N 19/577 |
| | | | 375/240.26 |
| 2023/0128399 A1* | 4/2023 | Deshpande | H04N 19/176 |
| | | | 375/240.25 |
| 2023/0134652 A1* | 5/2023 | Deshpande | H04N 19/172 |
| | | | 375/240.03 |
| 2023/0140041 A1* | 5/2023 | Gan | H04N 19/176 |
| | | | 375/240.26 |

FOREIGN PATENT DOCUMENTS

| | | |
|---|---|---|
| KR | 20180122361 A | 11/2018 |
| KR | 102154742 B1 | 9/2020 |
| KR | 20200125724 A | 11/2020 |

* cited by examiner

| cclm_mode_flag | cclm_mode_idx | intra_chroma_pred_mode | lumaIntraPredMode | | | | |
|---|---|---|---|---|---|---|---|
| | | | 0 | 50 | 18 | 1 | X (0 <= X <= 66) |
| 0 | – | 0 | RC | 0 | 0 | 0 | 0 |
| 0 | – | 1 | 50 | RC | 50 | 50 | 50 |
| 0 | – | 2 | 18 | 18 | RC | 18 | 18 |
| 0 | – | 3 | 1 | 1 | 1 | RC | 1 |
| 0 | – | 4 | 0 | 50 | 18 | 1 | X |
| 1 | 0 | – | 81 | 81 | 81 | 81 | 81 |
| 1 | 1 | – | 82 | 82 | 82 | 82 | 82 |
| 1 | 2 | – | 83 | 83 | 83 | 83 | 83 |

FIG. 6

IMAGE ENCODING AND DECODING METHOD USING ADAPTIVE ALTERNATIVE MODE

CROSS-REFERENCE TO RELATED APPLICATION

This application is a U.S. national stage of International Application No. PCT/KR2021/017285, filed on Nov. 23, 2021, which claims priority to Korean Patent Application No. 10-2020-0157794, filed on Nov. 23, 2020, and Korean Patent Application No. 10-2021-0161970, filed on Nov. 23, 2021, the entire disclosures of which are incorporated herein by reference.

TECHNICAL FIELD

The present disclosure relates to image encoding and decoding using an adaptive alternative mode.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include Video Versatile Coding VVC, which improves coding efficiency over High Efficiency Video Coding HEVC by about 30%, as well as H.264/AVC and HEVC.

The sizes, resolutions, and frame rates of pictures are getting gradually higher, and therefore the volume of data to be encoded is also increasing. Thus, a new compression technique is required for offering better encoding efficiency and a significant improvement in picture quality compared to existing compression techniques. In particular, there is a need for a compression technique that can encode pictures with a complex texture more efficiently, such as pictures containing edges (boundaries between objects) that vary in direction due to the presence of various objects.

SUMMARY

A primary object of the present disclosure is to provide a method of effectively encoding an intra-prediction mode for a chroma channel and a method of effectively decoding an intra-prediction mode for the chroma channel.

The video decoding method for decoding a current block by using intra-prediction according to an embodiment includes decoding related information on a chroma intra-prediction mode of the current block from a bitstream. The video decoding method also includes determining the chroma intra-prediction mode by using a set of basic intra-prediction modes and an alternative mode according to the related information and a first luma intra-prediction mode corresponding to the current block. The video decoding method also includes generating a prediction block of the current block by using the chroma intra-prediction mode. The video decoding method also includes reconstructing a residual block of the current block from the bitstream. The video decoding method also includes reconstructing the current block by adding the prediction block and the residual block. The alternative mode is adaptively determined.

The video encoding method for encoding a current block by using intra-prediction according to an embodiment includes determining a chroma intra-prediction mode of the current block. The video encoding method also includes generating a prediction mode of the current block by using the chroma intra-prediction mode. The video encoding method also includes generating a residual block by subtracting the prediction block from the current block. The video encoding method also includes generating related information on the chroma intra-prediction mode by using a set of basic intra-prediction modes and an alternative mode according to the chroma intra-prediction mode and a first luma intra-prediction mode corresponding to the current block. The video encoding method also includes encoding the residual block and the related information, wherein the alternative mode is adaptively determined.

The decoder-readable recording medium according to an embodiment may store a bitstream generated by a video encoding method for encoding a current block by using intra-prediction. The video encoding method includes determining a chroma intra-prediction mode of the current block. The video encoding method also includes generating a prediction mode of the current block by using the chroma intra-prediction mode. The video encoding method also includes generating a residual block based on a difference between the current block and the prediction block. The video encoding method also includes generating related information on the chroma intra-prediction mode by using a set of basic intra-prediction modes and an alternative mode according to the chroma intra-prediction mode and a first luma intra-prediction mode corresponding to the current block. The video encoding method also includes encoding the residual block and the related information. The alternative mode is adaptively determined.

The present disclosure can enhance video encoding efficiency and decoded picture quality by providing a method that finds an intra-prediction mode more efficiently by additionally using an intra-prediction mode of a luma channel corresponding to a chroma channel in determining an intra-prediction mode of the chroma channel.

BRIEF DESCRIPTION OF DRAWINGS

FIG. 6 is a table showing an example in which information on an intra-prediction mode of a chroma block is generated.

DETAILED DESCRIPTION

Figure 1:
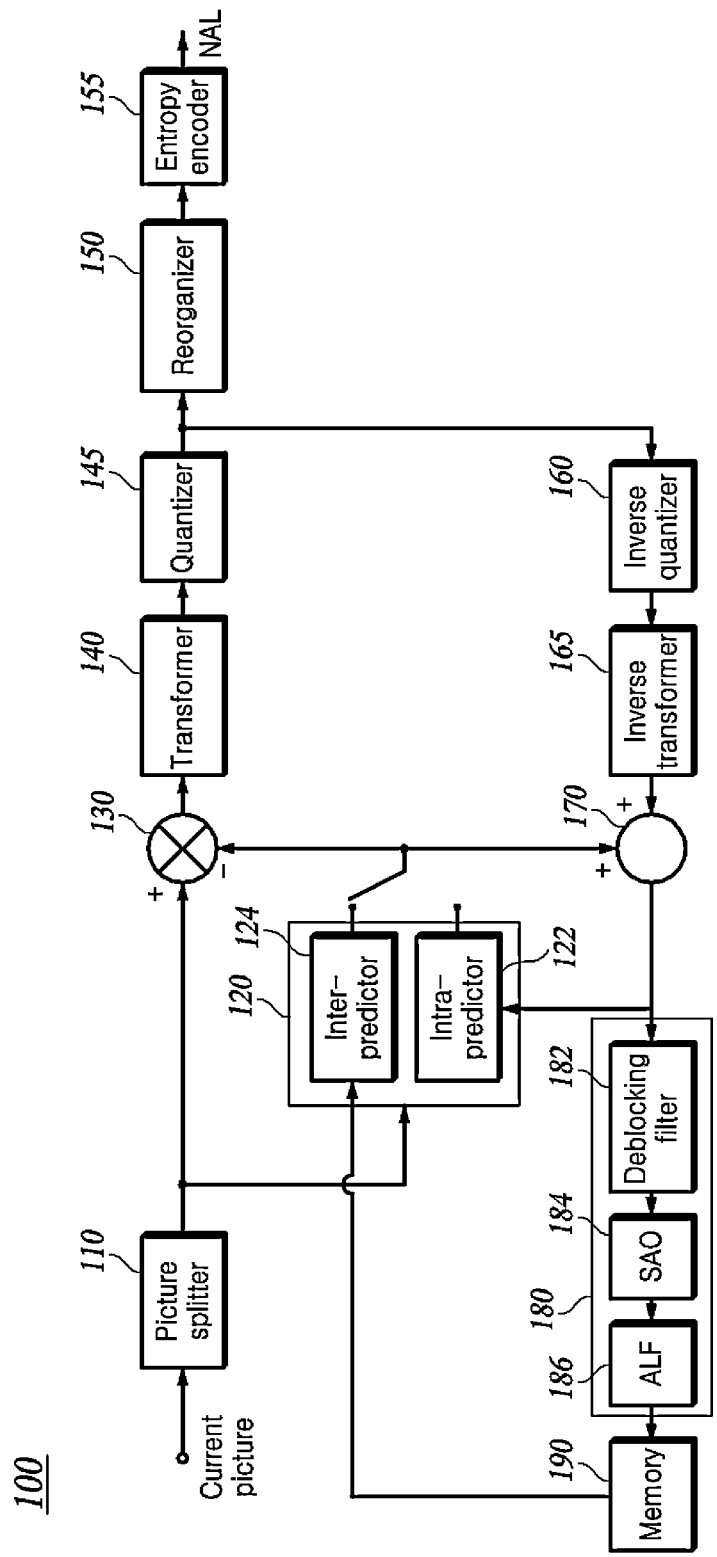
FIG. 1 is a block diagram of a video encoding apparatus according to an embodiment of the present disclosure.

Hereinafter, some embodiments of the present disclosure are described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein has been omitted to avoid obscuring the subject matter of the present disclosure.

FIG. 1 is a block diagram of a video encoding apparatus according to an embodiment of the present disclosure. Hereinafter, a video encoding apparatus 100 and its elements are described with reference to FIG. 1.

The video encoding apparatus 100 may include a block splitter 110, a predictor 120, a subtractor 130, a transformer 140, a quantizer 145, a reorganizer 150, an entropy encoder 155, an inverse quantizer (or de-quantizer) 160, an inverse transformer 165, an adder 170, a loop filter unit 180, and a memory 190.

Each element of the video encoding apparatus may be implemented in hardware, software, or a combination of hardware and software. The functions of the respective elements may be implemented as software, and a microprocessor may be implemented to execute the software functions corresponding to the respective elements.

One video includes one or more sequences including a plurality of pictures. Each picture is split into a plurality of regions, and encoding is performed on each region. For example, one picture is split into one or more tiles and/or slices. The one or more tiles may be defined as a tile group. Each tile or slice is split into one or more coding tree units (CTUs). Each CTU is split into one or more coding units (CUs) according to a tree structure. Information applied to each CU is encoded as the syntax of the CU, and information applied to CUs included in one CTU in common is encoded as the syntax of the CTU.

In addition, information commonly applied to all blocks in one slice is encoded as the syntax of a slice header, and information applied to all blocks constituting one or more pictures is encoded in a picture parameter set (PPS) or a picture header. Furthermore, information, which a sequence composed of a plurality of pictures refers to in common, is encoded in a sequence parameter set (SPS).

Information applied to one tile or tile group in common may be encoded as the syntax of a tile or tile group header. Syntaxes included in an SPS, a PPS, a slice header, and a tile or tile group header may be referred to as high-level syntaxes.

Additionally, a bitstream may include one or more adaptation parameter sets (APS) including parameters referred to by a picture or a pixel group smaller than the picture, for example, a slice. A picture header or a slice header includes an ID for identifying an APS used for a corresponding picture or slice. Pictures that refer to different PPSs or slices that refer to different picture headers may share the same parameters through the same APS ID.

Each of the plurality of pictures may be split into a plurality of subpictures that can be independently encoded/decoded and/or independently displayed. When subpicture splitting is applied, information on the layout of subpictures within a picture is signaled.

The block splitter 110 determines the size of a coding tree unit (CTU). Information about the size of the CTU (CTU size) is encoded as the syntax of the SPS or PPS and is transmitted to the video decoding apparatus.

The block splitter 110 splits each picture constituting the video into a plurality of CTUs having a predetermined size and then recursively splits the CTUs using a tree structure.

In the tree structure, a leaf node serves as a coding unit (CU), which is the basic unit of coding.

The tree structure may be the QuadTree (QT) in which a node (or parent node) is split into four sub-nodes (or child nodes) of the same size. The tree structure may also be the BinaryTree (BT) in which a node is split into two sub-nodes. The tree structure may also be the TernaryTree (TT) in which a node is split into three sub-nodes at a ratio of 1:2:1. The tree structure may also be the structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. BTTT may be collectively referred to as a multiple-type tree (MTT).

Figure 2:
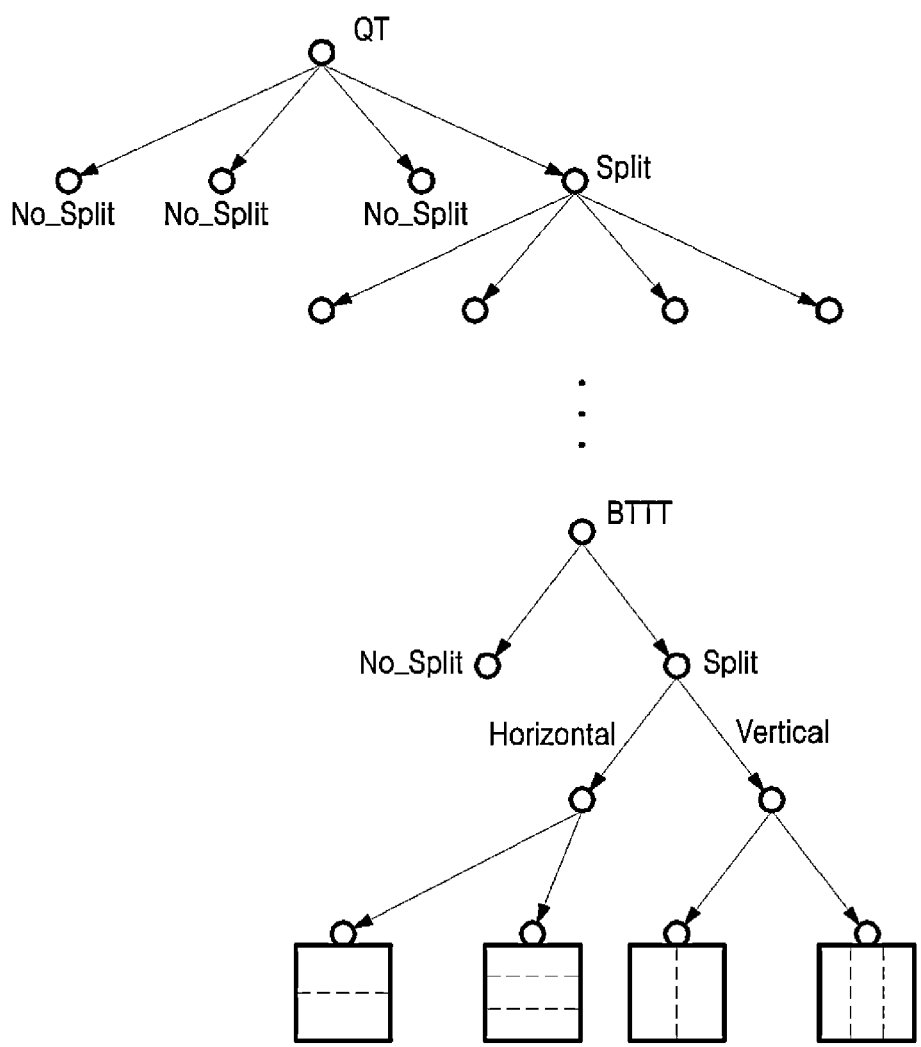
FIG. 2 is a view for explaining a method of splitting a block by using a quadtree plus binarytree ternarytree (QTBTTT) structure.

FIG. 2 is a view for explaining a method of splitting a block by using a QTBTTT structure.

As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT structure, the leaf node of the QT may be further split in one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into blocks of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a chroma block corresponding to a CU (i.e., a leaf node of QTBTTT) to be encoded or decoded is referred to as a current block or a target block. As QTBTTT splitting is employed, the shape of the chroma block may be square or rectangular.

Meanwhile, both a luma block and a chroma block may be split into CUs of the same type, or the luma block and the chroma block may be split in such a way as to have different splitting structures. In this case, a technique for allowing them to have different splitting structures is referred to as a Chroma Separate Tree (CST) technique. In other words, when the CST technique is used, the chroma block may have a different splitting method from the luma block.

The predictor 120 predicts the chroma block to generate a prediction block. The predictor 120 includes an intra-predictor 122 and an inter-predictor 124.

The intra-predictor 122 constructs reference samples from reconstructed samples positioned around the chroma block in the current picture including the chroma block and predicts samples in the chroma block using the reference pixels. There is a plurality of intra-prediction modes according to the prediction directions.

The intra-predictor 122 may determine an intra-prediction mode to be used in encoding the chroma block. The intra-predictor 122 may encode the chroma block using several intra-prediction modes and select an appropriate intra-prediction mode from these intra-prediction modes. For example, the intra-predictor 122 may calculate rate distortion values through the rate-distortion analysis about the encoding results using several intra-prediction modes. The intra-predictor 122 may also select the intra-prediction mode that has the best rate distortion characteristics among these intra-prediction modes as an intra-prediction mode to be used for encoding the chroma block.

The intra-predictor 122 selects one intra-prediction mode from among the plurality of intra-prediction modes and predicts the chroma block using reference samples and an equation determined according to the selected intra-prediction mode. Information about the selected intra-prediction mode is encoded by the entropy encoder 155 and transmitted to the video decoding apparatus.

Figure 3:
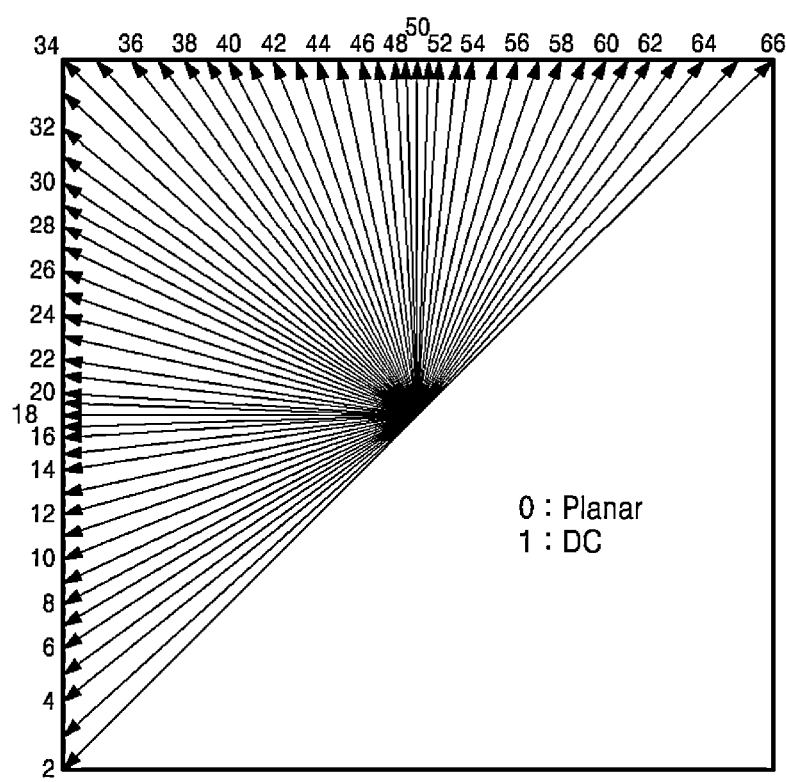
FIG. 3 is a view showing a plurality of intra-prediction modes.

FIG. 3 is a view showing a plurality of intra-prediction modes.

In an embodiment of the present disclosure, as shown in FIG. 3, the plurality of intra-prediction modes that can be used for prediction of a luma block may include two non-directional modes, which include a planar mode and a DC mode, and 65 directional modes. Reference samples and an equation to be used are defined differently for each prediction mode.

Moreover, intra-prediction may be performed on the chroma block as well in a more segmented manner according to various prediction directions that can be used for prediction of the luma block. However, although horizontal (Hor.) and vertical (Ver.) directional modes are available when intra-prediction is performed on the chroma block, it's not always possible that all of the various prediction directions that can be used for prediction of the luma block are available. In other words, apart from the horizontal and vertical directional modes among the directional modes, a directional prediction mode (i.e., first luma intra-prediction mode) selected as an intra-prediction mode of the luma block corresponding to the chroma block may be used for prediction of the chroma block.

The intra-predictor 122 may predict the chroma block by using planar, DC, vertical, and horizontal modes as a set of basic intra-prediction modes when encoding the chroma block, and the intra-predictor 122 may also use the first luma intra-prediction mode in predicting the chroma block.

Further, the intra-predictor 122 may predict the chroma block by using an RC (replacement mode for chroma) mode (or an alternative intra-prediction mode; hereinafter, simply referred to as "alternative mode"), apart from the set of basic intra-prediction modes and the first luma intra-prediction mode.

The intra-predictor 122 may adaptively determine the alternative mode based on the intra-prediction mode of the block neighboring the chroma block (i.e., first video component) which is the current block.

The chroma block and the neighboring blocks are highly associated with each other. Accordingly, in intra-prediction, the chroma block and the neighboring block may have the same intra-prediction mode or similar intra-prediction modes. In the present embodiment, which was devised in view of this, an intra-prediction mode for a neighboring block may be determined and used as the alternative mode.

Figure 4:
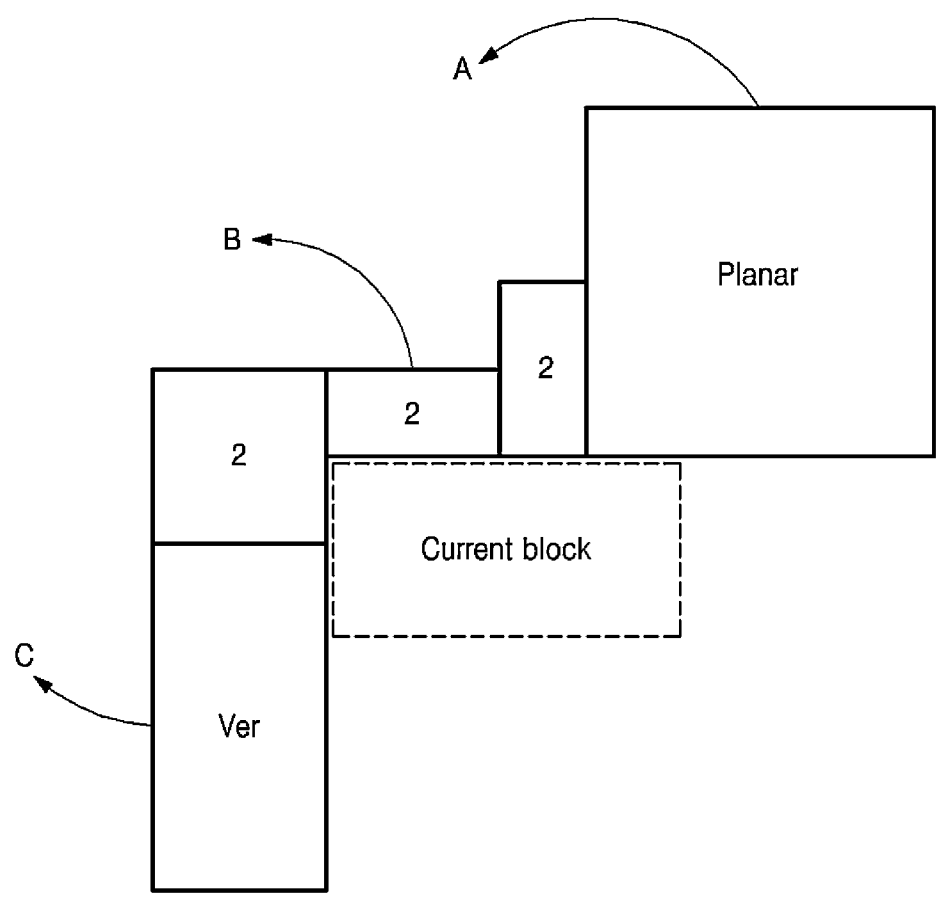
FIG. 4 is a view illustrating intra-prediction modes for a chroma block and neighboring blocks.

FIG. 4 is a view illustrating intra-prediction modes for a chroma block and neighboring blocks.

What is written in each neighboring block in FIG. 4 refers to an intra-prediction mode for that block.

The alternative mode may be determined based on the frequency of occurrence of the intra-prediction modes of the blocks neighboring the chroma block.

In an embodiment of the present disclosure, the most frequent mode among the intra-prediction modes of the neighboring blocks is determined and used as the alternative mode. For example, when the neighboring blocks of the chroma block are as shown in FIG. 4, and the modes of the neighboring blocks are one Mode Planar, three Mode 2, and one Mode Ver, respectively, the most frequent mode is Mode 2 and therefore Mode 2 is determined as the alternative mode.

The alternative mode may be determined based on the size of the chroma block and the sizes of the neighboring blocks. For example, the intra-prediction mode of the neighboring block similar in size to the chroma block may be determined as the alternative mode. The largest block among the neighboring blocks of the chroma block in FIG. 4 is Block A, so the planar mode which is the intra-prediction mode for Block A is determined as the alternative mode.

The alternative mode may be determined based on the shape of the chroma block and the shapes of the neighboring blocks.

For example, the intra-prediction mode for the block having the same shape as the chroma block among the neighboring blocks may be determined and used as the alternative mode.

The shape of a block may be calculated as an aspect ratio, which is the ratio of the horizontal length to the vertical length of the block. Mode 2 is the intra-prediction mode for Block B, which has the same aspect ratio and shape as the chroma block as shown in FIG. 4, and is determined as the alternative mode. In some embodiments, an intra-prediction mode for ae neighboring block most similar in shape (i.e., aspect ratio) to the chroma block may be determined as the alternative mode.

An intra-prediction mode for a neighboring block having the same size as the chroma block may be determined and used as the alternative mode.

The size of a block may be calculated as a multiplication of a horizontal length and a vertical length. For example, Mode Ver, i.e., the intra-prediction mode for Block C, which has the same size as the chroma block in FIG. 4, is determined as the alternative mode. In some embodiments, an intra-prediction mode of a neighboring block most similar in size to the chroma block may be determined as the alternative mode.

Moreover, in another embodiment, an intra-prediction mode for a neighboring block having the same width as the chroma block or the most similar width may be determined as the alternative mode. Also, an intra-prediction mode for a neighboring block having the same height as the chroma block or the most similar height may be determined as the alternative mode.

An intra-prediction mode of a neighboring block having the largest number of pixels contiguous to the chroma block may be determined as the alternative mode. This is because it may be estimated that the more pixels a block shares as a block boundary surface with the chroma block, the more similar the properties of the block and the chroma block become. For example, Mode 2, which is the intra-prediction mode for Block B having the largest number of block boundary pixels contiguous to the chroma block as shown in FIG. 4, is determined as the alternative mode.

In this way, when encoding is performed by determining the alternative mode based on the intra-prediction mode of a neighboring block, the features of the image can be used more adaptively compared to when a particular preset mode is always used as the alternative mode, thereby improving encoding efficiency.

Meanwhile, if the alternative mode selected according to the above embodiment is the same as the first luma intra-prediction mode, an intra-prediction mode different from the selected alternative mode may be determined and used as the alternative mode.

For example, when the most frequent mode among the intra-prediction modes of the neighboring blocks is the same as the first luma intra-prediction mode, the intra-predictor 122 may determine and use the second most frequent intra-prediction mode as the alternative mode.

Moreover, when the intra-prediction mode of the neighboring block that is most similar in shape to the chroma block (i.e., most similar in aspect ratio) is the same as the first luma intra-prediction mode, the intra-predictor 122 may determine and use the intra-prediction mode of the neighboring block having the second most similar aspect ratio to that of the chroma block as the alternative mode.

Furthermore, if the intra-prediction mode to be selected as the alternative mode is the same as the first luma intra-prediction mode, the intra-predictor 122 may select a particular preset intra-prediction mode (e.g., diagonal mode) as the alternative mode.

Figure 5:
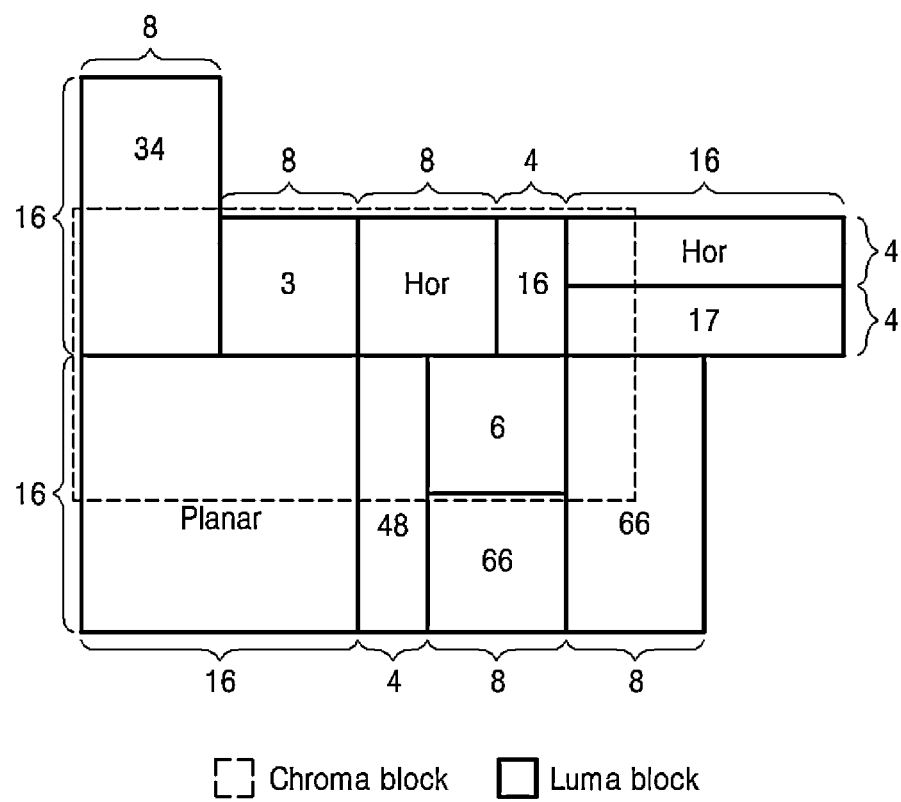
FIG. 5 is a view illustrating the position of a luma block spatially corresponding to a chroma block.

FIG. 5 is a view illustrating the position of a luma block spatially corresponding to a chroma block.

When the CST technique is applied, a chroma channel and a luma channel are split separately. Thus, the two channel may have different splitting structures. When the CST technique is applied, there are one or more luma blocks containing the pixels of a luma channel, which correspond to each pixel position in a chroma block. Typically, several luma blocks may correspond to them, as illustrated in FIG. 5.

Accordingly, in the present embodiment, the alternative mode may be determined based on intra-prediction modes of the pixels of the luma channel corresponding to the positions of the pixels within the chroma block.

What is displayed in each block in FIG. 5 represents the intra-prediction mode of a corresponding block, and the number next to the block indicates the length of its side. Also, in the following description, the blocks containing the pixels of a luma channel in the same spatial positions as the pixels in a chroma block are called as the luma blocks that spatially correspond to the chroma block.

The alternative mode may be determined based on the intra-prediction mode (i.e., second luma intra-prediction mode) of at least one luma block (i.e., second luma block) corresponding to the spatial position of the chroma block.

The alternative mode may be determined based on the frequency of occurrence of the second luma intra-prediction modes. In other words, the most frequent mode among the second luma intra-prediction modes of the luma blocks spatially corresponding to the chroma block may be determined as the alternative mode. For example, as shown in FIG. 5, the second luma intra-prediction mode and the number of times the second luma intra-prediction mode has occurred are Mode 34 (once), Mode 3 (once), Mode Hor (twice), Mode 16 (once), Mode 17 (once), Mode 6 (once), Mode 66 (once), Mode 48 (once), and Mode Planar (once). Accordingly, the Mode Hor is determined as the alternative mode since the most frequent mode among them is the Mode Hor.

The alternative mode may be determined based on the sizes of the luma blocks spatially corresponding to the chroma block. The intra-prediction mode of the largest one among the luma blocks spatially corresponding to the chroma block may be determined as the alternative mode. For example, Mode Planar, which is the intra-prediction mode of the luma block including (16×8=128) pixels located at the positions corresponding to the chroma block among the spatially corresponding luma blocks of the chroma block as shown in FIG. 5, may be determined as the alternative mode.

The alternative mode may be determined based on the shape of the chroma block and the shapes of the spatially corresponding luma blocks. In one embodiment, the intra-prediction mode of the luma block having the same shape as the chroma block among the spatially corresponding luma blocks is determined as the alternative mode.

The shape of a block may be calculated as an aspect ratio, which is the ratio of the horizontal length to the vertical length of the block. For example, the chroma block in FIG. 5 measures 32×16 and its aspect ratio is 32/16=2. Since the luma block that measures 16×8 has an aspect ratio of 2 among the corresponding luma blocks, Mode Planar, which is the second luma intra-prediction mode of this luma block, is determined as the alternative mode. In some embodiments, the second luma intra-prediction mode of the neighboring block most similar in shape (i.e., aspect ratio) to the chroma block may be determined as the alternative mode.

In this case, too, if the alternative mode is the same as the first luma intra-prediction mode, an intra-prediction mode different from the first luma intra-prediction mode may be reset as the alternative mode.

For example, if the most frequent second luma intra-prediction mode among the second luma intra-prediction modes is the same as the first luma intra-prediction mode, the intra-predictor 122 may determine and use the second most frequent second luma intra-prediction mode as the alternative mode.

Moreover, if the intra-prediction mode of the largest one among the luma blocks spatially corresponding to the chroma block is the same as the first luma intra-prediction mode, the intra-predictor 122 may determine and use the intra-prediction mode for the second largest luma block as the alternative mode.

Furthermore, if the intra-prediction mode of the luma block that is most similar in shape and aspect ratio to the chroma block is the same as the first luma intra-prediction mode, the intra-predictor 122 may determine and use the intra-prediction mode of the luma block having the second most similar shape and aspect ratio to those of the chroma block as the alternative mode.

Also, if the intra-prediction mode that the intra-predictor 122 is about to select as the alternative mode is the same as the first luma intra-prediction mode, the intra-predictor 122 may select a particular preset intra-prediction mode (e.g., diagonal mode) as the alternative mode or may select, as the alternative mode, a neighboring intra-prediction mode having a prediction direction difference from the prediction direction indicated by the first luma intra-prediction mode by a certain offset.

If there is one luma block corresponding to the spatial position of the chroma block, the intra-predictor 122 may determine, as the alternative mode, a neighboring intra-prediction mode having a prediction direction difference from the prediction direction indicated by the intra-prediction mode of the corresponding luma block by a certain offset.

In case of performing the prediction on the chroma block in a set of basic intra-prediction modes including the planar, DC, vertical, and horizontal modes, the first luma intra-prediction mode, and the alternative mode and selecting one of the intra prediction modes, the intra-predictor 122 may generate intra-chroma-pred_mode as information on the intra-prediction mode of the chroma block.

If the intra-prediction mode of the chroma block is the same as the first luma intra-prediction mode, intra_chroma_pred_mode is set as a DM mode.

If the intra-prediction mode of the chroma block is not same as the first luma intra-prediction mode but is the same as one of the set of basic intra-prediction modes and the alternative mode, intra_chroma_pred_mode is set as information for identifying one of the set of basic intra-prediction modes and the alternative mode.

FIG. 6 is a table showing an example in which information on an intra-prediction mode of a chroma block is generated.

When a CCLM (Cross-Component Linear Model) technique is used, cclm_mode_flag, cclm_mode_idx, and intra_chroma_pred_mode are generated as information on an intra-prediction mode of a chroma block as shown in FIG. 6.

cclm_mode_flag is information indicating whether to use a neighboring reference chroma sample in order to encode the chroma block, and cclm_mode_idx is information indicating the position of a neighboring block when using a neighboring reference chroma sample in order to encode the chroma block.

A further description has been omitted since the details of the CCLM technique depart from the subject matter of the present disclosure.

When the CCLM technique is not used for prediction of the chroma block, cclm_mode_flag is set to 0, and information for identifying an intra-prediction mode used for prediction of the chroma block is set to intra_chroma_pred_mode.

The inter-predictor 124 generates a prediction block for the chroma block through a motion compensation process. A detailed description has been omitted since the details of the operation of the inter-predictor 124 depart from the subject matter of the present disclosure.

The subtractor 130 generates a residual block by subtracting the prediction block generated by the intra-predictor 122 or the inter-predictor 124 from the chroma block.

The transformer 140 may transform residual signals in the residual block. The second-dimensional size of the residual block may be used as a transform unit (hereinafter, "TU") which is a block size for performing transformation. Alternatively, the residual block may be partitioned into a plurality of subblocks and the residual signals in each subblock may be transformed by using the subblock as the transform unit.

The transformer 140 may split the residual block into one or more subblocks, apply the transformation to the one or more subblocks, and thus transform the residual values of the transform blocks from a pixel domain to a frequency domain. In the frequency domain, the transformed blocks are referred to as coefficient blocks or transform blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like. The transform kernel also may be referred to as a transform matrix.

The transformer 140 may individually transform the residual block or the transform unit in a horizontal direction and a vertical direction. For transformation, various types of transform kernels or transform matrices may be used. For example, a pair of transform kernels for transformation in the horizontal direction and the vertical direction may be defined as a multiple transform set (MTS). The transformer 140 may select one transform kernel pair having the best transform efficiency in the MTS and transform the residual block in the horizontal and vertical directions, respectively. Information (mts_idx) on the transform kernel pair selected from the MTS is encoded by the entropy encoder 155 and signaled to the video decoding apparatus.

The quantizer 145 quantizes the transform coefficients output from the transformer 140 using quantization parameters and outputs the quantized transform coefficients to the entropy encoder 155. For some blocks or frames, the quantizer 145 may directly quantize a related residual block without transformation. The quantizer 145 may apply different quantization coefficients (scaling values) depending on positions of the transform coefficients in the transform block. A matrix of quantization coefficients applied to transform coefficients arranged in two dimensions may be encoded and signaled to the video decoding apparatus.

The reorganizer 150 may reorganize the coefficient values for the quantized residual values. The reorganizer 150 may change the 2-dimensional array of coefficients into a 1-dimensional coefficient sequence through coefficient scanning. For example, the reorganizer 150 may scan coefficients from a DC coefficient to a coefficient in a high frequency region using a zig-zag scan or a diagonal scan to output a 1-dimensional coefficient sequence. Depending on the size of the transform unit and an intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan, and the horizontal scan depending on the size of the transform unit and the intra-prediction mode.

The entropy encoder 155 generates a bitstream by encoding the sequence of the one-dimensional quantized transform coefficients output from the reorganizer 150 by using various encoding techniques such as Context-based Adaptive Binary Arithmetic Code (CABAC) and exponential Golomb.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the chroma block is encoded by intra-prediction or inter-prediction. The entropy encoder 155 encodes intra-prediction information (i.e., information about an intra-prediction mode) or inter-prediction information (information about a merge index in the case of a merge mode or a reference picture index and a differential motion vector in the case of an AMVP mode) according to the prediction type. In addition, the entropy encoder 155 encodes information related to quantization, i.e., information on quantization parameters and information on a quantization matrix.

The de-quantizer 160 inversely quantizes the quantized transform coefficients output from the quantizer 145 to generate transform coefficients. The inverse transformer 165 transforms the transform coefficients output from the de-quantizer 160 from the frequency domain to the spatial domain and reconstructs a residual block.

The adder 170 reconstructs a chroma block by adding a reconstructed residual block and a prediction block generated by the predictor 120. The samples in the reconstructed chroma block are used as reference pixels in performing intra-prediction of a next block.

The loop filter unit 180 filters the reconstructed samples to reduce blocking artifacts, ringing artifacts, blurring artifacts, and the like generated due to block-based prediction and transformation/quantization. The loop filter unit 180 may include one or more of a deblocking filter 182, a sample adaptive offset (SAO) filter 184, or an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference, which is caused by lossy coding, between a reconstructed sample and an original sample, and performs filtering in a manner of adding a corresponding offset to each reconstructed sample. The ALF 186 performs filtering on a target sample to be filtered by applying filter coefficients to the target sample and neighboring samples of the target sample. The ALF 186 may divide the samples included in a picture into predetermined groups and then may determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 7:
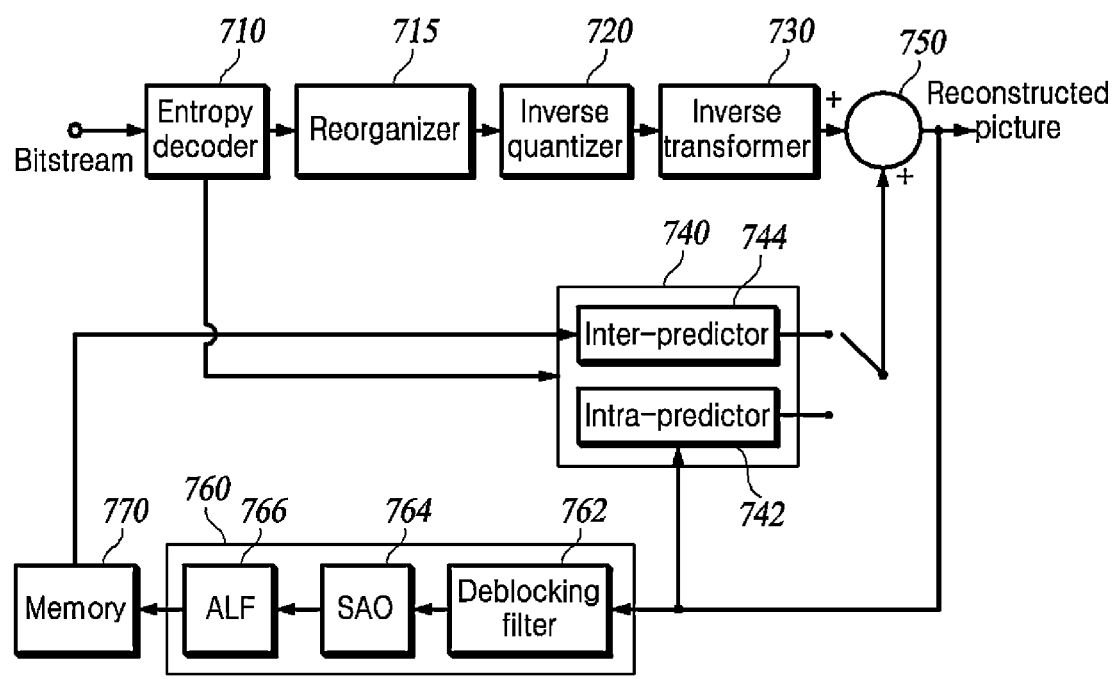
FIG. 7 is a block diagram of a video decoding apparatus according to an embodiment of the present disclosure.

FIG. 7 is a block diagram of a video decoding apparatus according to an embodiment of the present disclosure. Hereinafter, the video decoding apparatus and elements of the apparatus are described with reference to FIG. 7.

The video decoding apparatus 700 may include an entropy decoder 710, a reorganizer 715, an inverse quantizer (or de-quantizer) 720, an inverse transformer 730, a predictor 740, an adder 750, a loop filter unit 760, and a memory 770.

Each element of the video decoding apparatus may be implemented in hardware, software, or a combination of hardware and software. Further, the function of each element may be implemented in software, and the microprocessor may be implemented to execute the function of software corresponding to each element.

The entropy decoder 710 determines a chroma block to be decoded by decoding a bitstream generated by the video encoding apparatus and extracting information related to block splitting and extracts prediction information and information about a residual signal, and the like required to reconstruct the chroma block.

The entropy decoder 710 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure, and extracts splitting information about the CTU to split the CTU using the tree structure.

For example, when the CTU is split using a QTBTTT structure, a first flag (QT_split_flag) related to the QT splitting is extracted to split each node into four nodes of a lower-layer. For a node corresponding to the leaf node of the QT, the second flag (MTT_split_flag) and information about a splitting direction (vertical/horizontal) and/or a splitting type (binary/ternary) related to the MTT splitting are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to the QT splitting is extracted, and each node is split into four nodes of a lower layer. Then, a split flag (split_flag) indicating whether a node corresponding to a leaf node of QT is further split in the BT and the splitting direction information are extracted.

Once the chroma block to be decoded is determined through splitting in the tree structure, the entropy decoder 710 extracts information about a prediction type indicating whether the chroma block is intra-predicted or inter-predicted. When the prediction type information indicates intra-prediction, the entropy decoder 710 extracts a syntax element for the intra-prediction information (intra-prediction mode) for the chroma block. When the prediction type information indicates inter-prediction, the entropy decoder 710 extracts a syntax element for the inter-prediction information, i.e., information indicating a motion vector and a reference picture to be referenced by the motion vector.

The entropy decoder 710 also extracts information about quantized transform coefficients of the chroma block as information related to quantization and information about residual signals.

The reorganizer 715 may change the sequence of the one-dimensional quantized transform coefficients entropy-decoded by the entropy decoder 710 to a 2-dimensional coefficient array (i.e., block) in a reverse order of the coefficient scanning performed by the video encoding apparatus.

The de-quantizer 720 inversely quantizes the quantized transform coefficients using the quantization parameter. The de-quantizer 720 may apply different quantization coefficients (scaling values) to the quantized transform coefficients arranged in two dimensions. The de-quantizer 720 may perform inverse quantization by applying a matrix of quantization coefficients (scaling values) from the video encoding apparatus to a two-dimensional array of quantized transform coefficients.

The inverse transformer 730 inversely transforms the de-quantized transform coefficients from the frequency domain to the spatial domain to reconstruct residual signals, thereby generating a reconstructed residual block for the current block. In addition, when the MTS is applied, the inverse transformer 730 determines transform kernels or transform matrices to be applied in the horizontal and vertical directions, respectively, using the MTS information (mts_idx) signaled from the video encoding apparatus and uses the determined transform functions to inversely transform the transform coefficients in the transform block in the horizontal and vertical directions.

The predictor 740 may include an intra-predictor 742 and an inter-predictor 744.

The intra-predictor 742 is activated when the prediction type of the chroma block is intra-prediction, and the inter-predictor 744 is activated when the prediction type of the chroma block is inter-prediction.

The intra-predictor 742 determines an intra-prediction mode of the chroma block among a plurality of intra-prediction modes based on the syntax element for the intra-prediction mode extracted from the entropy decoder 710 and predicts the chroma block using the reference samples around the chroma block according to the determined intra-prediction mode.

The intra-predictor 742 reconstructs the value of cclm_mode_flag as a syntax element for the intra-prediction mode. If the result of the reconstruction of the value of cclm_mode_flag indicates the use of cclm technology, the intra-predictor 742 reconstructs the value of intra_chroma_pred_mode.

If intra_chroma_pred_mode means DM, the intra-predictor 742 determines an intra-prediction mode (i.e., first luma intra-prediction mode) of the luma block corresponding to the chroma block as an intra-prediction mode for the chroma block.

For example, as shown in FIG. 6, if intra_chroma_pred_mode=4, this means a DM mode. Accordingly, for intra_chroma_pred_mode=4, the decoder construes this as signaling the DM mode, and the intra-predictor 742 sets the value of IntraPredModeC, which is the intra-prediction mode of the chroma block, to be equal to the value of lumaIntraPredMode which is the first luma intra-prediction mode.

Hereinafter, in case that intra_chroma_pred_mode does not mean the DM mode, the method in which the intra-predictor 742 determines the intra-prediction mode for the chroma block by using the first luma intra-prediction mode and intra_chroma_pred_mode together is described.

If the first luma intra-prediction mode is not one of the Planar mode, the DC mode, the vertical mode, or the horizontal mode, which belong to a set of basic intra-prediction modes, the intra-predictor 742 determines an intra-prediction mode indicated by intra_chroma_pred_mode as the intra-prediction mode of the chroma block.

Here, the intra-prediction mode indicated by intra_chroma_pred_mode is one of the set of basic intra-prediction modes.

If the first luma intra-prediction mode is one of the set of basic intra-prediction modes, the intra-predictor 742 determines either a basic intra-prediction mode or an alternative mode according to the value of intra-chroma_pred_mode.

Here, it is assumed that lumaIntraPredMode is the first luma intra-prediction mode is 50, which represents a vertical direction. In this case, if the value of intra_pred_mode transmitted through a bitstream indicates a direction other than the vertical direction, the intra-predictor 742 determines the intra-prediction mode indicated by the value of intra_chroma_pred_mode as the intra-prediction mode of the chroma block.

Also, if lumaIntraPredMode indicates the vertical direction and the value of intra_chroma_pred_mode also indicates the vertical direction, i.e., lumaIntraPredMode and the value of intra_chroma_pred_mode indicate the same direction, the intra-predictor 742 determines a separate alternative mode as the intra-prediction mode of the chroma block, as shown in FIG. 6.

Here, the alternative mode to be used is not always a single particular mode but may be adaptively determined according to information on a neighboring block or a corresponding luma block.

The intra-predictor 742 may adaptively determine the alternative mode based on an intra-prediction mode of a block neighboring the chroma block (i.e., first video component) which is the current block.

The intra-predictor 742 may determine the alternative mode based on the frequency of occurrence of intra-prediction modes of the blocks neighboring the chroma block.

As illustrated in FIG. 4, the intra-predictor 742 determines and uses the most frequent intra-prediction mode among the intra-prediction modes of the neighboring blocks as the alternative mode. For example, when the neighboring blocks of the chroma block are as shown in FIG. 4, and the modes of the neighboring blocks are one Mode Planar, tree Mode 2, and one Mode Ver, respectively, the most frequent mode is Mode 2 and therefore Mode 2 is determined as the alternative mode.

The alternative mode may be determined based on the size of the chroma block and the sizes of the neighboring blocks. For example, an intra-prediction mode of a neighboring block similar in size to the chroma block may be determined as the alternative mode. The largest block among the neighboring blocks of the chroma block in FIG. 4 is Block A, so Mode Planar, which is an intra-prediction mode for Block A, is determined as the alternative mode.

The alternative mode may be determined based on the shape of the chroma block and the shapes of the neighboring blocks. For example, an intra-prediction mode for a block having the same shape as the chroma block among the neighboring blocks may be determined and used as the alternative mode.

The shape of a block may be calculated as an aspect ratio which is the ratio of the horizontal length to the vertical length of the block. Mode 2 is the intra-prediction mode for Block B, which has the same aspect ratio as the chroma block as shown in FIG. 4, is determined as the alternative mode. In some embodiments, an intra-prediction mode for a neighboring block most similar in shape (i.e., aspect ratio) to the chroma block may be determined as the alternative mode.

An intra-prediction mode for a neighboring block having the same size as the chroma block may be determined and used as the alternative mode.

The size of a block may be calculated as a multiplication of its width and height. For example, Mode Ver, i.e., the intra-prediction mode for Block C, which has the same size as the chroma block in FIG. 4, is determined as the alternative mode. In some embodiments, an intra-prediction mode for a neighboring block most similar in size to the chroma block may be determined as the alternative mode.

Moreover, an intra-prediction mode for a neighboring block having the same width as the chroma block or the most similar width may be set as the alternative mode. Also, an intra-prediction mode for a neighboring block having the same height as the chroma block or the most similar height may be set as the alternative mode.

An intra-prediction mode for a neighboring block having the largest number of pixels contiguous to the chroma block may be determined as the alternative mode. This is because it may be estimated that, in neighboring blocks adjoining the chroma block, the more pixels a block shares as a block boundary surface with the chroma block, the more similar the properties of the block and the chroma block become. For example, Mode 2, which is the intra-prediction mode for Block B having the largest number of block boundary pixels contiguous to the chroma block as shown in FIG. 4, is determined as the alternative mode.

In this way, when encoding is performed by determining the alternative mode based on the intra-prediction mode of a neighboring block, the features of the image can be used more adaptively compared to when a particular preset mode is always used as the alternative mode. Thus, encoding efficiency may be improved.

Meanwhile, if the alternative mode selected according to the above embodiment is the same as the first luma intra-prediction mode, an intra-prediction mode different from the selected alternative mode may be determined and used as the alternative mode.

For example, when the most frequent mode among the intra-prediction modes of the neighboring blocks is the same as the first luma intra-prediction mode, the intra-predictor 742 may determine and use the second most frequent intra-prediction mode as the alternative mode.

Moreover, the intra-prediction mode of the neighboring block that is most similar in shape to the chroma block (i.e., most similar in aspect ratio) is the same as the first luma intra-prediction mode, the intra-predictor 742 may determine and use the intra-prediction mode of the neighboring block having the second most similar aspect ratio to that of the chroma block as the alternative mode.

Furthermore, if the intra-prediction mode to be selected as the alternative mode is the same as the first luma intra-prediction mode, the intra-predictor 742 may select a particular preset intra-prediction mode (e.g., diagonal mode) as the alternative mode.

When the CST (chroma separate tree) technique is applied, a chroma channel and a luma channel are split separately. Thus, the two channel may have different splitting structures. When the CST technique is applied, there are one or more luma blocks containing the pixels of a luma channel which correspond to each pixel position in a chroma block. Typically, several luma blocks may correspond to them, as illustrated in FIG. 5.

Accordingly, in the present embodiment, the alternative mode may be determined based on intra-prediction modes of the pixels of the luma channel corresponding to the positions of the pixels within the chroma block.

In FIG. 5, the blocks containing pixels of the luma channel in the same spatial positions as the pixels in the chroma block are called as the luma blocks that spatially correspond to the chroma block.

The alternative mode may be determined based on the intra-prediction mode (i.e., second luma intra-prediction mode) of at least one luma block (i.e., second luma block) corresponding to the spatial position of the chroma block.

The alternative mode may be determined based on the frequency of occurrence of the second luma intra-prediction modes. In other words, the most frequent mode among the second luma intra-prediction modes of the luma blocks spatially corresponding to the chroma block may be determined as the alternative mode. For example, as shown in FIG. 5, the second luma intra-prediction mode and the number of times the second luma intra-prediction mode has occurred are Mode 34 (once), Mode 3 (once), Mode Hor (twice), Mode 16 (once), Mode 17 (once), Mode 6 (once), Mode 66 (once), Mode 48 (once), and Mode Planar (once). Accordingly, the Mode Hor is determined as the alternative mode since the most frequent mode among them is the Mode Hor.

The alternative mode may be determined based on the sizes of the luma blocks spatially corresponding to the chroma block. The intra-prediction mode of the largest one among the luma blocks spatially corresponding to the chroma block may be determined as the alternative mode. For example, Mode Planar, which is the intra-prediction mode of the luma block including (16×8=128) pixels located at the positions corresponding to the chroma block among the spatially corresponding luma blocks of the chroma block as shown in FIG. 5, may be determined as the alternative mode.

The alternative mode may be determined based on the shape of the chroma block and the shapes of the spatially corresponding luma blocks. In one embodiment, the intra-prediction mode of the luma block having the same shape as the chroma block among the spatially corresponding luma blocks is determined as the alternative mode.

The shape of a block may be calculated as an aspect ratio, which is the ratio of the horizontal length to the vertical length of the block. For example, the chroma block in FIG. 5 measures 32×16 and its aspect ratio is 32/16=2. Since the luma block that measures 16×8 has an aspect ratio of 2 among the corresponding luma blocks, Mode Planar, which is the second luma intra-prediction mode of this luma block, is determined as the alternative mode. In some embodiments, the second luma intra-prediction mode of the neighboring block most similar in shape (i.e., aspect ratio) to the chroma block may be determined as the alternative mode.

Also, in this case, if the alternative mode is the same as the first luma intra-prediction mode, an intra-prediction mode different from the first luma intra-prediction mode may be reset as the alternative mode.

For example, if the most frequent second luma intra-prediction mode among the second luma intra-prediction modes is the same as the first luma intra-prediction mode, the intra-predictor 742 may determine and use the second most frequent second luma intra-prediction mode as the alternative mode.

Moreover, if the intra-prediction mode of the largest one among the luma blocks spatially corresponding to the chroma block is the same as the first luma intra-prediction mode, the intra-predictor 742 may determine and use the intra-prediction mode for the second largest luma block as the alternative mode.

Furthermore, if the intra-prediction mode of the luma block that is most similar in aspect ratio to the chroma block is the same as the first luma intra-prediction mode, the intra-predictor 742 may determine and use the intra-prediction mode of the neighboring block having the second most similar aspect ratio to that of the chroma block as the alternative mode.

Also, if the intra-prediction mode that the intra-predictor 742 is about to select as the alternative mode is the same as the first luma intra-prediction mode, the intra-predictor 742 may select a particular preset intra-prediction mode (e.g., diagonal mode) as the alternative mode or may select, as the alternative mode, a neighboring intra-prediction mode having a prediction direction difference from the prediction direction indicated by the first luma intra-prediction mode by a certain offset.

If there is one luma block corresponding to the spatial position of the chroma block, the intra-predictor 742 may determine, as the alternative mode, an intra-prediction mode (i.e., neighboring intra-prediction mode) having a prediction direction difference from the prediction direction indicated by the intra-prediction mode of the corresponding luma block by a certain offset.

The inter-predictor 744 determines the motion vector of the chroma block and the reference picture to which the motion vector refers to by using a syntax element for an inter-prediction mode extracted from the entropy encoder 710. The inter-predictor 744 also predicts the chroma block by using the motion vector and the reference picture.

The inter-predictor 744 may perform interpolation filtering according to the value of the motion vector of the chroma block. In other words, if the decimal part of the motion vector is not zero, the inter-predictor 744 generates subsamples indicated by that decimal part through interpolation. If the decimal part of the horizontal component (x component) of the motion vector is not zero, interpolation is performed horizontally, and if the decimal part of the vertical component (y component) of the motion vector is not zero, interpolation is performed vertically.

The adder 750 reconstructs the chroma block by adding the residual block outputted from the inverse transformer 730 and the prediction block outputted from the inter-predictor 744 or the intra-predictor 742. The samples in the reconstructed chroma block are used as reference samples in performing intra-prediction of a block to be decoded later.

The loop filter unit 760 may include at least one of a deblocking filter 762, a SAO filter 764, or an ALF 766.

The deblocking filter 762 performs deblocking filtering of the boundary between the reconstructed blocks to remove the blocking artifacts caused by block-by-block decoding.

The SAO filter 764 performs filtering in a manner of adding a corresponding offset to the reconstructed blocks after the deblocking filtering, in order to compensate for a difference between a reconstructed sample and an original sample caused by lossy coding.

The ALF 766 performs filtering on a target sample by applying filter coefficients to the target sample and the neighboring samples of the target sample. The ALF 766 may divide the samples included in a picture into predetermined groups and then may determine one filter to be applied to a corresponding group to differentially perform filtering on each group. The filter coefficients of the ALF 766 are determined by using information about filter coefficients decoded from the bitstream.

The reconstructed blocks filtered through the loop filter unit 760 are stored in the memory 770. Once all blocks in one picture are reconstructed, the reconstructed picture may be used as a reference picture for inter-prediction of blocks in a picture to be encoded next.

Figure 8:
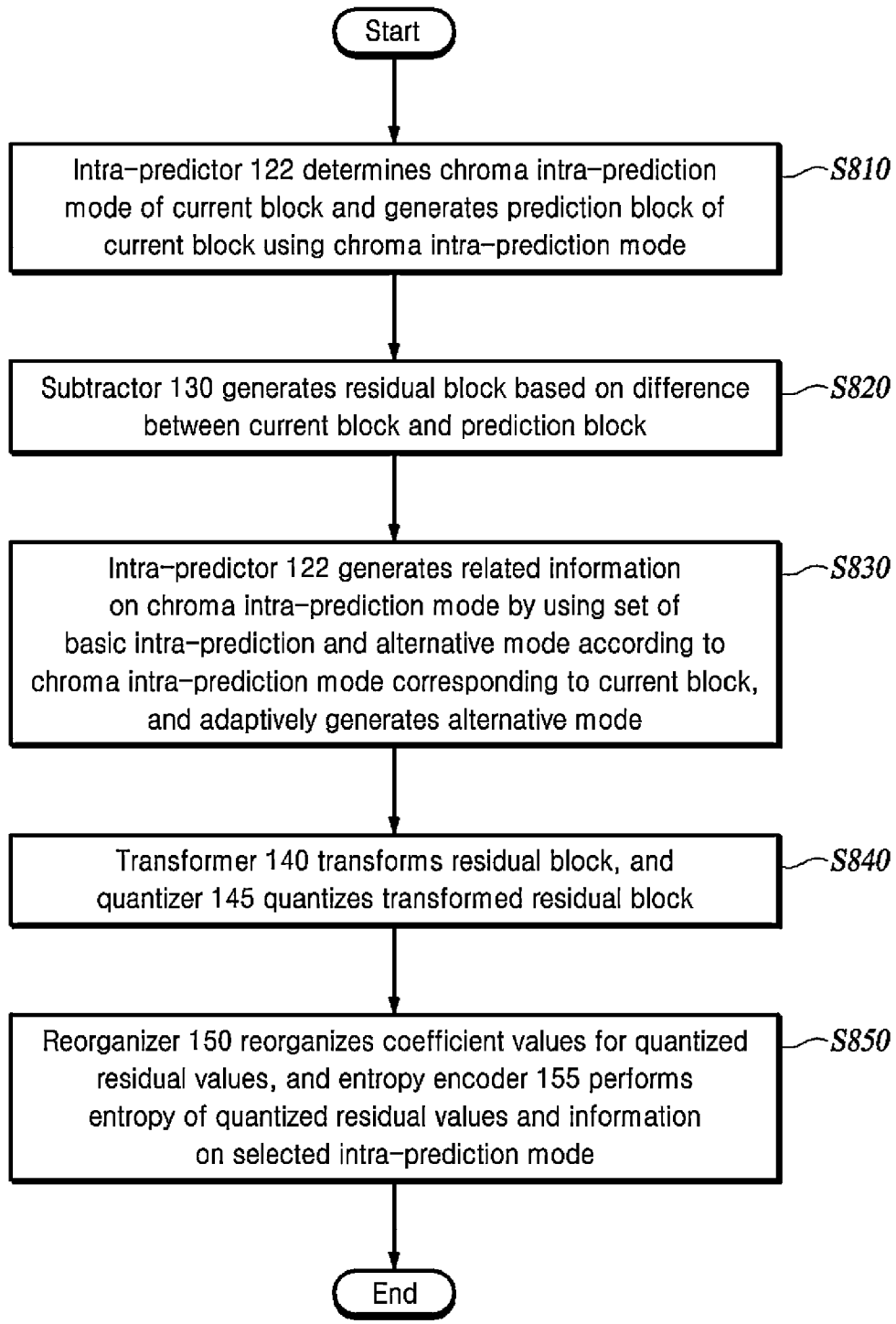
FIG. 8 is a flowchart of a video encoding method according to an embodiment of the present disclosure.

FIG. 8 is a flowchart of a video encoding method according to an embodiment of the present disclosure.

The intra-predictor 122 of the video encoding apparatus 100 determines a chroma intra-prediction mode of the current block and generates a prediction block of the current block using the chroma intra-prediction mode (S810).

The subtractor 130 generates a residual block based on the difference between the current block and the prediction block (S820).

The intra-predictor 122 generates related information on the chroma intra-prediction mode by using a set of basic intra-prediction modes and an alternative mode according to the chroma intra-prediction mode and a first luma intra-prediction mode corresponding to the current block and adaptively generates the alternative mode (S830).

The transformer 140 transforms the residual block, and the quantizer 145 quantizes the transformed residual block (S840).

The reorganizer 150 reorganizes the coefficient values for the quantized residual values, and the entropy encoder 155 performs entropy encoding of the quantized residual values and information on the selected intra-prediction mode (S850).

The steps S810 through S850 have been explained in full in the description of the video encoding apparatus 100, so a further detailed description has been omitted.

Figure 9:
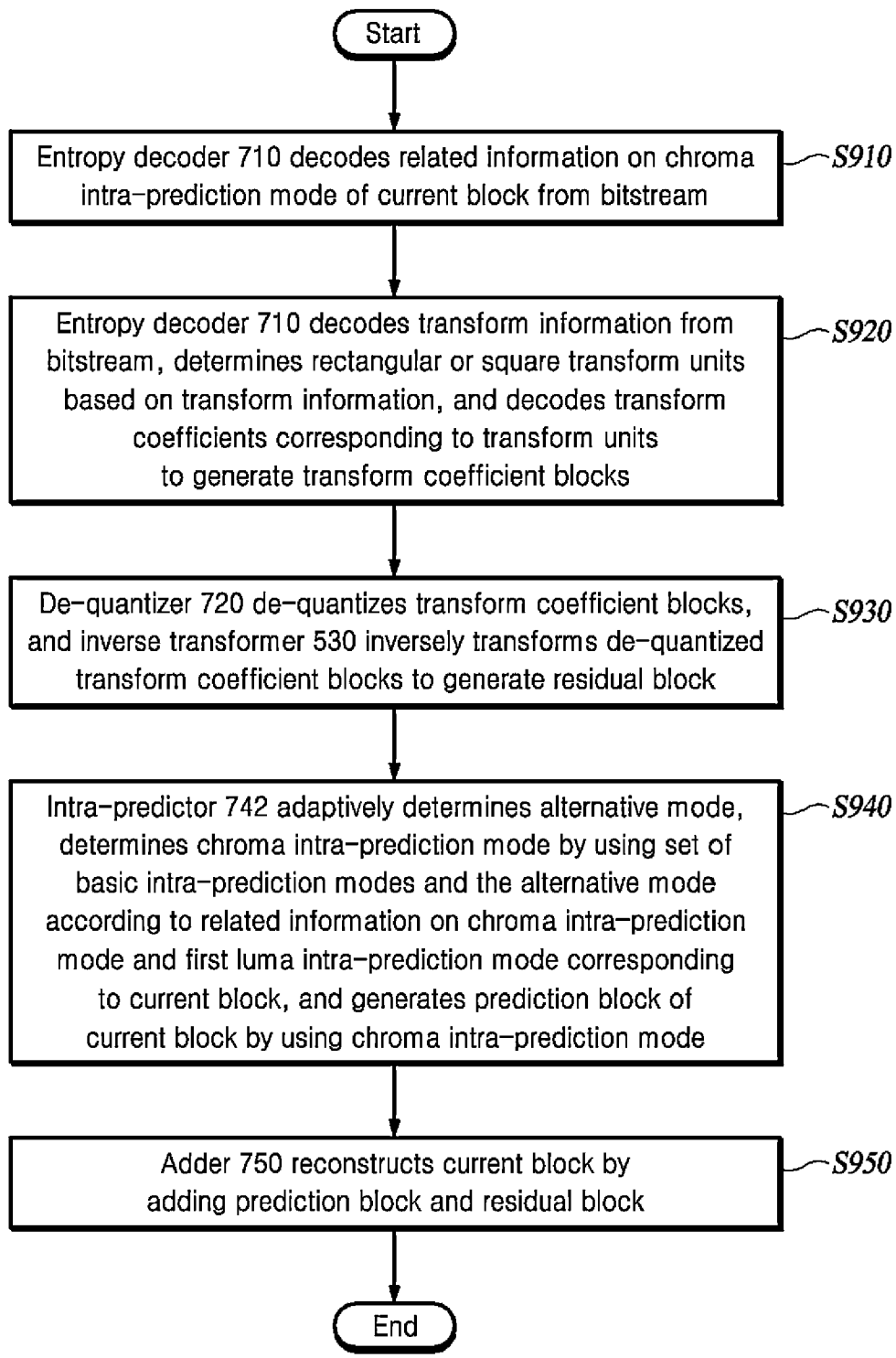
FIG. 9 is a flowchart of a video decoding method according to an embodiment of the present disclosure.

FIG. 9 is a flowchart of a video decoding method according to an embodiment of the present disclosure.

The entropy decoder 710 of the video decoding apparatus 700 decodes the related information on the chroma intra-prediction mode of the current block from a bitstream (S910).

Moreover, the entropy decoder 710 decodes transform information from the bitstream, determines rectangular or square transform units based on the transform information, and decodes transform coefficients corresponding to the transform units to generate transform coefficient blocks (S920).

The de-quantizer 720 inversely quantizes the transform coefficient blocks, and the inverse transformer 530 inversely transforms the de-quantized transform coefficient blocks to generate a residual block (S930).

The intra-predictor 742 adaptively determines an alternative mode, determines a chroma intra-prediction mode by using a set of basic intra-prediction modes and the alternative mode according to the related information on the chroma intra-prediction mode and a first luma intra-prediction mode corresponding to the current block, and generates a prediction block of the current block by using the chroma intra-prediction mode (S940).

The adder 750 reconstructs the current block by adding the prediction block and the residual block (S950).

The steps S910 through S950 have been explained in full in the description of the video decoding apparatus 700, so a further detailed description has been omitted.

Meanwhile, various functions or methods described in the present disclosure may be implemented with instructions stored in a non-transitory recording medium that can be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

It should be understood that the embodiments described above may be implemented in many different ways. The functions described in one or more examples may be implemented in hardware, software, firmware, or any combination thereof. It should be understood that the functional components described herein have been labeled "unit" to further emphasize their implementation independence.

The above description is merely illustrative of the technical idea of the present disclosure. Those having ordinary skill in the art to which the present disclosure pertains may make various modifications and changes without departing from the essential characteristics of the present disclosure. Therefore, the embodiments disclosed in the present disclosure are not intended to limit the technical idea of the present disclosure but to describe the present disclosure, and the scope of the technical idea of the present disclosure is not limited thereto. The protection scope of the present disclosure should be interpreted by the claims, and all technical ideas within the equivalent scope should be interpreted as being included in the scope of the present disclosure.

DESCRIPTION OF REFERENCE NUMERALS

| | |
|---|---|
| 100: video encoding apparatus | 110: block splitter |
| 120: predictor | 122: intra-predictor |
| 124; inter-predictor | 130: substractor |
| 140: transformer | 145: quantizer |
| 150: reorganizer | 155: entrophy encoder |
| 160: inverse quantizer | 165: inverse transformer |
| 170: adder | 180: loop filter unit |
| 182: deblocking filter | 184: SAO |
| 186: ALF | 190: memory |
| 700: video decoding apparatus | 710: entropy decoder |
| 715: reorganizer | 720: inverse quantizer |
| 730: inverse transformer | 740: predictor |
| 742: intra-predictor | 744: inter-predictor |
| 750: adder | 760: loop filter unit |
| 762: deblocking filter | 764: SAO |
| 766: ALF | 770: memory |

What is claimed is:

1. A video decoding method for decoding a current block by using intra-prediction, the method comprising:
   decoding related information on a chroma intra-prediction mode of the current block from a bitstream;
   determining the chroma intra-prediction mode according to the related information from among a set of basic intra-prediction modes, an alternative mode, and a first luma intra-prediction mode corresponding to the current block;
   generating a prediction block of the current block by using the chroma intra-prediction mode;
   reconstructing a residual block of the current block from the bitstream; and
   reconstructing the current block by adding the prediction block and the residual block,
   wherein the alternative mode is adaptively derived based on information of neighboring blocks of the current block or information of corresponding luma area of the current block, and
   wherein the alternative mode is used when the related information indicates one of basic intra-prediction modes other than the first luma intra-prediction mode and the indicated basic intra-prediction mode is equal to the first luma intra-prediction mode.

2. The method of claim 1, wherein the alternative mode is determined based on a frequency of occurrence of intra-prediction modes of blocks neighboring the current block.

3. The method of claim 1, wherein an intra-prediction mode of a neighboring block similar in size to the current block is determined as the alternative mode.

4. The method of claim 1, wherein an intra-prediction mode of a neighboring block similar in shape to the current block is determined as the alternative mode.

5. The method of claim 1, wherein an intra-prediction mode of a neighboring block having a largest number of pixels contiguous to the current block is determined as the alternative mode.

6. The method of claim 1, wherein the alternative mode is determined based on a second luma intra-prediction mode of at least one second luma block corresponding to a position of the current block.

7. The method of claim 6, wherein the alternative mode is determined based on a frequency of occurrence of the second luma intra-prediction mode.

8. The method of claim 6, wherein the alternative mode is determined based on a size of the at least one second luma block.

9. The method of claim 6, wherein the alternative mode is determined based on a shape of the current block and a shape of the at least one second luma block.

10. The method of claim 6, wherein, if the alternative mode is same as the first luma intra-prediction mode, an intra-prediction mode different from the first luma intra-prediction mode is reset as the alternative mode.

11. The method of claim 10, wherein a neighboring intra-prediction mode having a prediction direction difference from a prediction direction which the first luma intra-prediction mode indicates by a certain offset is determined as the alternative mode.

12. A video encoding method for encoding a current block by using intra-prediction, the method comprising:
   determining a chroma intra-prediction mode of the current block;
   generating a prediction mode of the current block by using the chroma intra-prediction mode;
   generating a residual block by subtracting a prediction block from the current block;
   generating related information on the chroma intra-prediction mode according to the chroma intra-prediction mode by using a set of basic intra-prediction modes, an alternative mode, and a first luma intra-prediction mode corresponding to the current block; and
   encoding the residual block and the related information,
   wherein the alternative mode is adaptively derived baed on information of neighboring blocks of the current block or information of corresponding luma area of the current block, and
   wherein the alternative mode is used when the related information indicates one of basic intra-prediction modes other than the first luma intra-prediction mode and the indicated basic intra-prediction mode is equal to the first luma intra-prediction mode.

13. The method of claim 12, wherein the alternative mode is determined based on an intra-prediction mode of a block neighboring the current block.

14. The method of claim 13, wherein the alternative mode is determined based on a frequency of occurrence of intra-prediction modes of neighboring blocks.

15. The method of claim 13, wherein an intra-prediction mode of a neighboring block similar in size to the current block is determined as the alternative mode.

16. The method of claim 13, wherein an intra-prediction mode of a neighboring block having a largest number of pixels contiguous to the current block is determined as the alternative mode.

17. The method of claim 12, wherein the alternative mode is determined based on a frequency of occurrence of a second luma intra-prediction mode of at least one second luma block corresponding to a position of the current block.

18. The method of claim 12, wherein the alternative mode is determined based on a size of at least one second luma block corresponding to a position of the current block.

19. The method of claim 12, wherein, if the alternative mode is same as the first luma intra-prediction mode, an intra-prediction mode different from the first luma intra-prediction mode is reset as the alternative mode.

20. A method for providing video data to a video decoding device, a method comprising:
  encoding the video data into a bitstream; and
  transmitting the bitstream to the video decoding device,
  wherein encoding the video data comprises:
    determining a chroma intra-prediction mode of a current block;
    generating a prediction mode of the current block by using the chroma intra-prediction mode;
    generating a residual block based on a difference between the current block and a prediction block;
    generating related information on the chroma intra-prediction mode according to the chroma intra-prediction mode by using a set of basic intra-prediction modes, an alternative mode, and a first luma intra-prediction mode corresponding to the current block; and
    encoding the residual block and the related information,
  wherein the alternative mode is adaptively derived based on information of neighboring blocks of the current block or information of corresponding luma area of the current block, and
  wherein the alternative mode is used when the related information indicates one of basic intra-prediction modes other than the first luma intra-prediction mode and the indicated basic intra-prediction mode is equal to the first luma intra-prediction mode.

* * * * *